US012631980B2

(12) United States Patent
Ochi et al.

(10) Patent No.: US 12,631,980 B2
(45) Date of Patent: May 19, 2026

(54) YELLOW TONER

(71) Applicant: CANON KABUSHIKI KAISHA, Tokyo (JP)

(72) Inventors: Kouichirou Ochi, Chiba (JP); Masayuki Hama, Ibaraki (JP); Hayato Ida, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 533 days.

(21) Appl. No.: 18/334,709

(22) Filed: Jun. 14, 2023

(65) Prior Publication Data

US 2024/0004324 A1 Jan. 4, 2024

(30) Foreign Application Priority Data

Jun. 22, 2022 (JP) ................................ 2022-100003
Jun. 12, 2023 (JP) ................................ 2023-095999

(51) Int. Cl.
*G03G 9/09* (2006.01)
*G03G 9/08* (2006.01)
*G03G 9/087* (2006.01)

(52) U.S. Cl.
CPC ........... *G03G 9/091* (2013.01); *G03G 9/0827* (2013.01); *G03G 9/08755* (2013.01); *G03G 9/08759* (2013.01)

(58) Field of Classification Search
CPC ................. G03G 9/091; G03G 9/0827; G03G 9/08755; G03G 9/08759; C08K 5/34
See application file for complete search history.

(56) References Cited

U.S. PATENT DOCUMENTS 8,921,023 B2 12/2014 Baba et al.
8,927,188 B2 1/2015 Naka et al.
9,057,970 B2 6/2015 Ida et al.
9,348,247 B2 5/2016 Ida et al.
9,348,253 B2 5/2016 Kanno et al.
9,540,483 B2 1/2017 Ida et al.
9,651,883 B2 5/2017 Hama et al.
9,696,644 B2 7/2017 Ida et al.
9,897,934 B2 2/2018 Tamura et al.
10,012,920 B2 7/2018 Shibata et al.
10,036,970 B2 7/2018 Kanno et al.
10,078,281 B2 9/2018 Ida et al.
10,082,743 B2 9/2018 Hama et al.
10,088,765 B2 10/2018 Miyakai et al.
10,146,146 B2 12/2018 Komatsu et al.
10,175,595 B2 1/2019 Onozaki et al.
10,197,936 B2 2/2019 Onozaki et al.
10,203,619 B2 2/2019 Yamashita et al.
10,228,629 B2 3/2019 Tamura et al.
10,274,851 B2 4/2019 Hashimoto et al.
10,353,312 B2 7/2019 Kamae et al.
10,401,748 B2 9/2019 Hashimoto et al.
10,423,086 B2 9/2019 Hama et al.
10,451,986 B2 10/2019 Sano et al.
10,451,990 B2 10/2019 Kamae et al.
10,474,049 B2 11/2019 Onozaki et al.
10,514,624 B2 12/2019 Tamura et al.
10,564,560 B2 2/2020 Onozaki et al.
10,599,060 B2 3/2020 Kanno et al.
10,656,545 B2 5/2020 Kamae et al.
10,775,710 B1 9/2020 Kamae et al.
10,859,931 B2 12/2020 Hashimoto et al.
10,877,386 B2 12/2020 Murayama et al.
10,969,705 B2 4/2021 Shirayama et al.
11,029,617 B2 6/2021 Chimoto et al.
11,112,711 B2 9/2021 Ochi et al.
11,131,939 B2 9/2021 Hama et al.
11,181,848 B2 11/2021 Ochi et al.
11,385,558 B2 7/2022 Chimoto et al.
11,624,986 B2 4/2023 Kanno et al.
11,624,987 B2 4/2023 Tokunaga et al.
11,662,670 B2 5/2023 Hama et al.
11,675,283 B2 6/2023 Kamae et al.
11,714,362 B2 8/2023 Kanno et al.
11,809,131 B2 11/2023 Kamae et al.
11,835,873 B2 12/2023 Hashimoto et al.
11,914,325 B2 2/2024 Hashimoto et al.
12,140,906 B2 11/2024 Kanno et al.
12,222,677 B2 2/2025 Watanabe et al.
12,271,151 B2 4/2025 Abe et al.
12,292,713 B2 5/2025 Kajihara et al.
12,326,690 B2 6/2025 Murata et al.
12,326,691 B2 6/2025 Hashimoto et al.
12,332,599 B2 6/2025 Ueda et al.
12,353,167 B2 7/2025 Kanno et al.
12,360,470 B2 7/2025 Miura et al.

(Continued)

FOREIGN PATENT DOCUMENTS

JP 2004-46095 A 2/2004
JP 2013-178563 A 9/2013
JP 2021-18270 A 2/2021

OTHER PUBLICATIONS

U.S. Appl. No. 19/381,549, filed Nov. 6, 2025, Junichi Tamura.
U.S. Appl. No. 19/395,682, filed Nov. 20, 2025, Takeshi Hashimoto.
U.S. Appl. No. 19/462,412, filed Jan. 28, 2026, Hisasuke Kajihara.

*Primary Examiner* — Peter L Vajda
*Assistant Examiner* — Grant Steven Seiler
(74) *Attorney, Agent, or Firm* — VENABLE LLP

(57) ABSTRACT

A yellow toner including a toner particle including a binder resin, a crystalline resin, and C.I. Pigment Yellow 180, a content of the C.I. Pigment Yellow 180 is 3% by mass or more and 15% by mass or less with respect to a mass of the toner, the C.I. Pigment Yellow 180 is in a form of plate-like particles each having a plate-like shape, and when the C.I. Pigment Yellow 180 is observed with a scanning electron microscope, the plate-like particles of the C.I. Pigment Yellow 180 satisfy the following relationships: $S/Z \geq 10.0$; and $50 \leq S \leq 300$, where the S (nm) represents a number average of circle-equivalent diameters calculated from areas of surfaces having largest areas of the plate-like particles, and the Z (nm) represents a number average of widths in directions perpendicular to the surfaces having the largest areas of the plate-like particles.

10 Claims, No Drawings

(56) References Cited

U.S. PATENT DOCUMENTS

| | | | | |
|---|---|---|---|---|
| 12,386,280 | B2 | 8/2025 | Kajihara et al. | |
| 12,449,741 | B2 | 10/2025 | Shino et al. | |
| 12,487,539 | B2 | 12/2025 | Kanno et al. | |
| 12,547,090 | B2 | 2/2026 | Ochi et al. | |
| 2003/0110982 | A1* | 6/2003 | Shimada et al. | C08K 5/34 |
| 2022/0197166 | A1 | 6/2022 | Chimoto et al. | |
| 2023/0152725 | A1 | 5/2023 | Ochi et al. | |
| 2023/0305419 | A1 | 9/2023 | Watanabe et al. | |
| 2023/0314972 | A1 | 10/2023 | Hashimoto et al. | |
| 2024/0061356 | A1 | 2/2024 | Kanno et al. | |
| 2024/0219854 | A1 | 7/2024 | Shino et al. | |
| 2025/0021028 | A1 | 1/2025 | Yamashita et al. | |
| 2025/0199426 | A1 | 6/2025 | Tamura et al. | |
| 2025/0199427 | A1 | 6/2025 | Sato et al. | |
| 2025/0314984 | A1 | 10/2025 | Hashimoto et al. | |

* cited by examiner

YELLOW TONER

BACKGROUND OF THE INVENTION

Field of the Invention

The present disclosure relates to a yellow toner to be used in an electrophotographic image forming method.

Description of the Related Art

In recent years, along with an increasingly widespread use of an electrophotographic full-color copying machine, there have been rising demands for an increase in speed of printing and energy saving measures. In order to adapt to high-speed printing, a technology for more quickly melting toner in a fixing process has been investigated.

A technology including using a crystalline resin having a moderate melting point and having the following characteristic has been proposed as such technology (Japanese Patent Application Laid-Open No. 2004-046095 and Japanese Patent Application Laid-Open No. 2013-178563): when the temperature of the resin is more than the melting point, the viscosity thereof largely reduces. In addition, a toner using C.I. Pigment Yellow 180 as a yellow pigment has been known (Japanese Patent Application Laid-Open No. 2021-18270).

However, it has been found that the toners described in the above-mentioned literatures are susceptible to improvement from the viewpoint of charging stability, and when high-speed printing is performed by using each of the toners under a high-temperature and high-humidity environment, an image density is liable to fluctuate owing to the insufficient charging stability. Further, the image density has been liable to fluctuate particularly in a yellow toner.

SUMMARY OF THE INVENTION

The present disclosure provides a yellow toner that achieves high charging stability even under a high-temperature and high-humidity environment while maintaining excellent low-temperature fixability.

The present disclosure relates to a yellow toner comprising a toner particle containing a binder resin, a crystalline resin, and C.I. Pigment Yellow 180, wherein a content of the C.I. Pigment Yellow 180 is 3% by mass or more and 15% by mass or less with respect to a mass of the toner, wherein the C.I. Pigment Yellow 180 is in a form of plate-like particles each having a plate-like shape, and wherein when the C.I. Pigment Yellow 180 is observed with a scanning electron microscope, the plate-like particles of the C.I. Pigment Yellow 180 satisfy the following relationships:

$$S/Z \geq 10.0; \text{ and}$$

$$50 \leq S \leq 300,$$

where the S (nm) represents a number average of circle-equivalent diameters calculated from areas of surfaces having largest areas of the plate-like particles of the C.I. Pigment Yellow 180, and the Z (nm) represents a number average of widths in directions perpendicular to the surfaces having the largest areas of the plate-like particles of the C.I. Pigment Yellow 180.

Further features of the present disclosure will become apparent from the following description of exemplary embodiments.

DESCRIPTION OF THE EMBODIMENTS

In the present disclosure, the description "XX or more and YY or less" or "from XX to YY" representing a numerical range means a numerical range including a lower limit and an upper limit that are end points unless otherwise stated. When numerical ranges are described in stages, the upper limits and lower limits of the numerical ranges may be combined in any combination.

According to the present disclosure, there is provided a yellow toner comprising a toner particle containing a binder resin, a crystalline resin, and C.I. Pigment Yellow 180, wherein a content of the C.I. Pigment Yellow 180 is 3% by mass or more and 15% by mass or less with respect to a mass of the toner, wherein the C.I. Pigment Yellow 180 is in a form of plate-like particles each having a plate-like shape, and wherein when the C.I. Pigment Yellow 180 is observed with a scanning electron microscope, the plate-like particles of the C.I. Pigment Yellow 180 satisfy the following relationships:

$$S/Z \geq 10.0; \text{ and}$$

$$50 \leq S \leq 300,$$

where the S (nm) represents a number average of circle-equivalent diameters calculated from areas of surfaces having largest areas of the plate-like particles of the C.I. Pigment Yellow 180, and the Z (nm) represents a number average of widths in directions perpendicular to the surfaces having the largest areas of the plate-like particles of the C.I. Pigment Yellow 180.

A possible reason why the above-mentioned toner can achieve high chargeability even under a high-temperature and high-humidity environment while maintaining excellent low-temperature fixability is as described below.

A segment that may be the crystal of the crystalline resin before the fixation of the toner is an aliphatic long-chain alkyl moiety. However, the crystal state of the segment is not a complete crystal, and hence a crystal disordered moiety is present. Such segment that has not completely become a crystal has high molecular mobility. Such segment having high molecular mobility hardly holds charge under a high-temperature and high-humidity environment. Accordingly, the use of the crystalline resin enables low-temperature fixation, but impairs the charging stability of the toner at the time of the performance of high-speed printing under the high-temperature and high-humidity environment to reduce the charging stability.

However, the inventors of the present disclosure have found that the above-mentioned toner can achieve high chargeability even under a high-temperature and high-humidity environment. The inventors have conceived a reason for the foregoing to be as described below.

In the present disclosure, the C.I. Pigment Yellow 180 is in a form of plate-like particles each having a plate-like shape, and when the C.I. Pigment Yellow 180 is observed with a scanning electron microscope, the plate-like particles of the C.I. Pigment Yellow 180 satisfy the following relationship: S/Z≥10.0, where the S (nm) represents the number average of the circle-equivalent diameters of the surface portions of the particles of the C.I. Pigment Yellow 180, and the Z (nm) represents the number average of the thicknesses thereof. As the S/Z becomes larger, the particles become more plate-like. A moderate attraction is caused by an interaction between an NH group moiety of such a plate-like particle of C.I. Pigment Yellow 180 and a carboxylic acid or an ester group present near the long-chain alkyl moiety of the crystalline resin. As a result, the crystal of the crystalline resin is oriented between the plate-like particles of the pigment to reduce the number of crystal disordered moieties. Further, the planarity the plate-like particles of the C.I.

Pigment Yellow 180 expresses a synergistic effect on the above-mentioned interaction between the NH group moiety and the carboxylic acid or the ester to reduce the number of the crystal disordered moieties of the crystalline resin. The inventors have assumed that the charging stability of the toner is thus improved.

The respective constituents of the toner are described below.

<CI. Pigment Yellow 180>

The toner particle contains the C.I. Pigment Yellow 180. The particles of the C.I. Pigment Yellow 180 of the present disclosure are plate-like particles each having a plate-like shape, and when the C.I. Pigment Yellow 180 is observed with a scanning electron microscope, the plate-like particles of the C.I. Pigment Yellow 180 satisfy the following relationships:

$S/Z \geq 10.0$; and $50 \leq S \leq 300$, where the S (nm) represents the number average of the circle-equivalent diameters calculated from the areas of the surfaces having the largest areas of the plate-like particles of the C.I. Pigment Yellow 180, and the Z (nm) represents the number average of the widths in directions perpendicular to the surfaces having the largest areas of the plate-like particles of the C.I. Pigment Yellow 180.

When the S/Z is 10.0 or more, the particles of the C.I. Pigment Yellow 180 can be regarded as being sufficiently plate-like. At this time, combined use of the pigment and the crystalline resin can suppress the occurrence of the crystal disordered moieties of the crystalline resin to improve the charging stability of the toner. The S/Z is preferably 12.0 or more. Meanwhile, the S/Z is preferably 20.0 or less, though its upper limit is not particularly limited.

The number average S of the circle-equivalent diameters of the surface portions is 50 or more and 300 or less. When the S is less than 50 or when the S is more than 300, the suppression of the occurrence of the crystal disordered moieties of the crystalline resin becomes deficient. The S preferably falls within the range of 100 or more and 250 or less.

Details about methods of measuring physical property values concerning the shapes of the particles of the C.I. Pigment Yellow 180 are described later.

Although the Pigment Yellow 180 obtained by typical synthesis has the rod-like shape, a method of changing the S or the Z for obtaining such plate-like shape as described above is, for example, a method including dissolving the C.I. Pigment Yellow 180 in a solvent and applying impact to the dispersed product with a ball mill to change its shape. Examples of the solvent include organic solvents, such as acetone, tetrahydrofuran, and toluene.

The content of the C.I. Pigment Yellow 180 of the present disclosure is 3% by mass or more and 15% by mass or less with respect to the mass of the toner. When the content is less than 3% by mass, a suppressing action on the occurrence of the crystal disordered moieties of the crystalline resin becomes deficient, and hence the charging stability of the toner reduces. When the content is more than 15% by mass, the dispersibility of the crystalline resin reduces owing to the filler effect of the Pigment Yellow 180, and hence the low-temperature fixability of the toner reduces. The content is preferably 5% by mass or more and 11% by mass or less.

In addition, it is preferred that the toner of the present disclosure has a peak at each of $2\theta=6.5°\pm0.1°$ and $2\theta=13.5°\pm0.1°$, where the θ represents a Bragg angle in X-ray diffraction measurement of the toner with a CuKα ray, and satisfies the following relationship: $I2/I1 \geq 2.0$, where the I1 represents a peak intensity at $2\theta=6.5°\pm0.1°$, and the I2 represents a peak intensity at $2\theta=13.5°\pm0.1°$.

The above-mentioned two peaks are peaks derived from the X-ray diffraction of the particles of the C.I. Pigment Yellow 180, and may occur because of the fact that the pigment has a layered structure. As the peak intensity ratio I2/I1 becomes larger, the number of layered repeating structures may be larger and a crystal having a uniform surface interval is provided. Accordingly, when the I2/I1 is equal to or more than 2.0, the number of the crystal disordered moieties of the crystalline resin sandwiched between the particles of the C.I. Pigment Yellow 180 easily reduces, and hence the charging stability is easily improved.

A more preferred range of the I2/I1 is as follows: $I2/I1 \geq 2.2$.

<Binder Resin>

The toner particle contains the binder resin that is an amorphous resin. A known polymer may be used as the binder resin, and specifically, for example, the following polymers may each be used.

There are given, for example, homopolymers of styrene and substituted products thereof, such as polystyrene, poly-p-chlorostyrene, and polyvinyltoluene; styrene-based copolymers, such as a styrene-p-chlorostyrene copolymer, a styrene-vinyltoluene copolymer, a styrene-vinylnaphthalene copolymer, a styrene-acrylic acid ester copolymer, a styrene-methacrylic acid ester copolymer, a styrene-α-chloromethyl methacrylate copolymer, a styrene-acrylonitrile copolymer, a styrene-vinyl methyl ether copolymer, a styrene-vinyl ethyl ether copolymer, a styrene-vinyl methyl ketone copolymer, and a styrene-acrylonitrile-indene copolymer; and polyvinyl chloride, a phenol resin, a natural resin-modified phenol resin, a natural resin-modified maleic acid resin, an acrylic resin, a methacrylic resin, polyvinyl acetate, a silicone resin, a polyester resin, a polyurethane resin, a polyamide resin, a furan resin, an epoxy resin, a xylene resin, polyvinyl butyral, a terpene resin, a coumarone-indene resin, and a petroleum resin. Those resins may be used alone or in combination thereof.

The polyester resin is preferably a polycondensate of a polyhydric alcohol compound and a polyvalent carboxylic acid compound.

Examples of the polyhydric alcohol compound include: alkylene oxide adducts of bisphenol A, such as polyoxypropylene(2.2)-2,2-bis(4-hydroxyphenyl)propane, polyoxypropylene(3.3)-2,2-bis(4-hydroxyphenyl)propane, polyoxyethylene(2.0)-2,2-bis(4-hydroxyphenyl)propane, polyoxypropylene(2.0)-polyoxyethylene(2.0)-2,2-bis(4-hydroxyphenyl)propane, and polyoxypropylene(6)-2,2-bis(4-hydroxyphenyl)propane; ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexane dimethanol, dipropylene glycol, polyethylene glycol, polypropylene glycol, polytetramethylene glycol, bisphenol A, and hydrogenated bisphenol A; and derivatives thereof. The derivatives are not particularly limited as long as similar resin structures are obtained by their condensation polymerization with the polyvalent carboxylic acid compound. Examples thereof include derivatives obtained by esterifying alcohol components.

At least one selected from the group consisting of alkylene oxide adducts of bisphenol A is preferably used as the polyhydric alcohol compound. The ratio of the alkylene oxide adduct of bisphenol A in the polyhydric alcohol compound is preferably 50 mol % or more and 100 mol % or less, more preferably 70 mol % or more and 100 mol % or less, still more preferably 90 mol % or more and 100 mol % or less.

As a trivalent or higher carboxylic acid component out of the polyvalent carboxylic acid compounds, there are given, for example, trimellitic acid, trimellitic anhydride, and pyromellitic acid.

An aromatic dicarboxylic acid and trimellitic acid or an anhydride thereof are each preferred as the polyvalent carboxylic acid compound, and terephthalic acid and trimellitic acid or the anhydride thereof are each more preferred. The content of the aromatic dicarboxylic acid such as terephthalic acid in the polyvalent carboxylic acid compound is preferably 60 mol % or more and 95 mol % or less, more preferably 70 mol % or more and 90 mol % or less, still more preferably 75 mol % or more and 85 mol % or less. The content of trimellitic acid or the anhydride thereof in the polyvalent carboxylic acid compound is preferably 5 mol % or more and 35 mol % or less, more preferably 10 mol % or more and 30 mol % or less, still more preferably 15 mol % or more and 25 mol % or less.

<Crystalline Resin>

The toner particle contains the crystalline resin. The incorporation of the crystalline resin accelerates the melting of the toner to improve the low-temperature fixability thereof.

The crystalline resin is, for example, crystalline polyester. A polyhydric alcohol (alcohol that is dihydric or trihydric or higher) and a polyvalent carboxylic acid (carboxylic acid that is divalent or trivalent or higher), or an acid anhydride thereof or a lower alkyl ester thereof are used as monomers to be used in the crystalline polyester. The crystalline polyester is preferably a polycondensate of a linear aliphatic polyhydric alcohol having 2 to 12 carbon atoms, and a linear aliphatic polyvalent carboxylic acid having 2 to 14 carbon atoms.

Such moiety having a repeating structure of a long alkyl moiety and an ester group easily causes an interaction with an NH group on the plate-like surface of the particle of the C.I. Pigment Yellow 180 in the toner, and as a result, can reduce the number of high-molecular mobility moieties resulting from the crystal disordered moieties of the crystalline resin.

Further, it is preferred that the crystalline polyester has a unit derived from an α,ω-linear aliphatic diol and a unit derived from an α,ω-linear aliphatic dicarboxylic acid, the linear aliphatic diol has 2 to 6 carbon atoms, and the linear aliphatic dicarboxylic acid has 10 to 14 carbon atoms. When such repeating structure of an alkyl group and an ester group is present with a density bias, the interaction with an NH group on the plate-like surface of the particle of the C.I. Pigment Yellow 180 is more easily caused, and as a result, the number of the high-molecular mobility moieties resulting from the crystal disordered moieties of the crystalline resin can be reduced.

It is more preferred that the linear aliphatic diol has 2 to 4 carbon atoms, and the linear aliphatic dicarboxylic acid has 10 to 14 carbon atoms.

The following polyhydric alcohol monomers may each be used as the polyhydric alcohol monomer to be used in the crystalline polyester. The polyhydric alcohol monomer is not particularly limited, but is preferably a chain (more preferably, linear) aliphatic diol. Examples thereof include ethylene glycol, diethylene glycol, triethylene glycol, 1,2-propylene glycol, 1,3-propylene glycol, dipropylene glycol, 1,4-butanediol, 1,4-butadiene glycol, trimethylene glycol, tetramethylene glycol, pentamethylene glycol, hexamethylene glycol, octamethylene glycol, nonamethylene glycol, decamethylene glycol, and neopentyl glycol. Of those, in particular, straight-chain aliphatic α,ω-diols, such as ethylene glycol, diethylene glycol, 1,4-butanediol, and 1,6-hexanediol, are preferred.

A polyhydric alcohol monomer except the polyhydric alcohols described above may also be used. As a dihydric alcohol monomer out of such polyhydric alcohol monomers, there are given, for example: an aromatic alcohol, such as polyoxyethylenated bisphenol A or polyoxypropylenated bisphenol A; and 1,4-cyclohexanedimethanol. In addition, as a trihydric or higher polyhydric alcohol monomer out of the polyhydric alcohol monomers, there are given, for example: an aromatic alcohol such as 1,3,5-trihydroxymethylbenzene; and an aliphatic alcohol, such as pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane, or trimethylolpropane.

The following polyvalent carboxylic acid monomers may each be used as the polyvalent carboxylic acid monomer to be used in the crystalline polyester. The polyvalent carboxylic acid monomer is not particularly limited, but is preferably a chain (more preferably, linear) aliphatic dicarboxylic acid. Specific examples thereof include: oxalic acid, malonic acid, succinic acid, glutaric acid, adipic acid, pimelic acid, suberic acid, glutaconic acid, azelaic acid, sebacic acid, nonanedicarboxylic acid, decanedicarboxylic acid, undecanedicarboxylic acid, dodecanedicarboxylic acid, maleic acid, fumaric acid, mesaconic acid, citraconic acid, and itaconic acid; and products obtained by hydrolyzing acid anhydrides or lower alkyl esters thereof.

A polyvalent carboxylic acid monomer except the polyvalent carboxylic acid monomers described above may also be used. As a divalent carboxylic acid out of such other polyvalent carboxylic acid monomers, there are given, for example: an aromatic carboxylic acid, such as isophthalic acid or terephthalic acid; an aliphatic carboxylic acid, such as n-dodecylsuccinic acid or n-dodecenylsuccinic acid; an alicyclic carboxylic acid such as cyclohexanedicarboxylic acid; and acid anhydrides or lower alkyl esters thereof.

In addition, as a trivalent or higher polyvalent carboxylic acid out of the other polyvalent carboxylic acid monomers, there are given, for example: an aromatic carboxylic acid, such as 1,2,4-benzenetricarboxylic acid (trimellitic acid), 2,5,7-naphthalenetricarboxylic acid, 1,2,4-naphthalenetricarboxylic acid, or pyromellitic acid; an aliphatic carboxylic acid, such as 1,2,4-butanetricarboxylic acid, 1,2,5-hexanetricarboxylic acid, or 1,3-dicarboxyl-2-methyl-2-methylenecarboxypropane; and derivatives, such as acid anhydrides or lower alkyl esters, thereof.

In addition, an example of the crystalline resin is a resin having a monomer unit represented by the following formula (1).

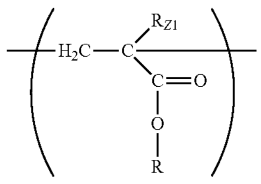

(1)

In the formula (1), $R_{Z1}$ represents a hydrogen atom or a methyl group, and R represents an alkyl group having 18 to 36 carbon atoms. Such resin as described above has a structure having crystallinity in a side chain thereof. Accordingly, the resin acts as a crystalline resin in the toner, and hence the toner becomes excellent in low-temperature fixability.

Such crystalline resin has such a structure that a crystalline segment is not incorporated into its main chain and is bound only by a side chain thereof, and hence an ester group near the crystalline segment and an NH group of the Pigment Yellow 180 easily interact with each other. Accordingly, combined use of the resin and the plate-like particles of the Pigment Yellow 180 can suppress the occurrence of the crystal disordered moieties of the crystalline segment.

The content of the crystalline resin in the toner particle is preferably 2% by mass or more and 10% by mass or less. When the content is less than 2% by mass, the low-temperature fixability of the toner is liable to deteriorate. When the content is more than 10% by mass, the charging stability thereof is liable to be insufficient.

In addition, in the present disclosure, it is preferred that, the toner satisfies the following relationship: $0.5 \leq P/C \leq 3.0$, where the C (% by mass) represents the content of the crystalline resin in the toner, and the P (% by mass) represents the content of the C.I. Pigment Yellow 180 in the toner.

When the P/C is less than 0.5, the suppressing action of the C.I. Pigment Yellow 180 on the crystal disordered moieties of the crystalline resin becomes deficient to make it difficult to obtain sufficient charging stability. When the P/C is more than 3.0, the number of the particles of the C.I. Pigment Yellow 180 sandwiching the crystalline resin is so large that a moiety having high mobility of the crystalline resin cannot be efficiently sandwiched therebetween. As a result, the number of the crystal disordered moieties of the resin increases to make it difficult to improve the charging stability of the toner. A more preferred range of the P/C is as follows: $1.0 \leq P/C \leq 2.0$.

The toner of the present disclosure preferably satisfies the following relationship: $0.015 \leq (P \times 6/732)/(C \times CA/56.1) \leq 0.113$, where the CA [mgKOH/g] represents an acid value of the crystalline resin, the C (% by mass) represents the content of the crystalline resin in the toner, and the P (% by mass) represents the content of the C.I. Pigment Yellow 180 in the toner.

Herein, $(P \times 6/732)$ in the above-mentioned formula represents the number of NH groups per mole of the C.I. Pigment Yellow 180, and $(C \times CA/56.1)$ represents the amount of an acid in the crystalline resin calculated from the acid value of the crystalline resin. When the value of the ratio is less than 0.015, the suppressing action of an NH group of the C.I. Pigment Yellow 180 on the crystal disordered moieties of the crystalline resin becomes deficient, and hence the charging stability is liable to be insufficient. In addition, when the value is more than 0.113, the number of the NH groups of the C.I. Pigment Yellow 180 sandwiching the crystalline resin is so large that the moiety having high mobility of the crystalline resin cannot be efficiently sandwiched therebetween. As a result, the number of the crystal disordered moieties increases to make it difficult to improve the charging stability.

<Nonionic Surfactant>

The toner of the present disclosure preferably includes a nonionic surfactant. Thus, an affinity between the C.I. Pigment Yellow 180 and the crystalline resin is improved to facilitate the association of the plate-like surface of the particle of the C.I. Pigment Yellow 180 and the crystalline resin in the toner. A polyoxyethylene alkyl ether is preferred as a specific compound that expresses the effect.

The content of the nonionic surfactant is preferably 1 part by mass or more and 5 parts by mass or less with respect to 100 parts by mass of the C.I. Pigment Yellow 180. When the content is less than 1 part by mass, the affinity between the C.I. Pigment Yellow 180 and the crystalline resin becomes deficient, and hence it becomes difficult to suppress the crystal disordered moieties of the crystalline resin. Thus, it becomes difficult to improve the charging stability. When the content is more than 5 parts by mass, an NH group of the C.I. Pigment Yellow 180 hardly appears on the surface thereof, and hence it becomes difficult to improve the charging stability.

The content of the nonionic surfactant is more preferably 2 parts by mass or more and 4 parts by mass or less with respect to 100 parts by mass of the C.I. Pigment Yellow 180.

<Releasing Agent>

A releasing agent that suppresses the occurrence of a hot offset at the time of the heating fixation of the toner may be used as required. General examples of the releasing agent may include low-molecular weight polyolefins, a silicone wax, fatty acid amides, ester waxes, carnauba wax, and hydrocarbon-based waxes.

<Charge Control Agent>

The toner particle may contain a charge control agent as required. The blending of the charge control agent can stabilize the charge characteristic of the toner and control the triboelectric charge quantity thereof to an optimum value in accordance with a developing system. Although a known charge control agent may be utilized as the charge control agent, a metal compound of an aromatic carboxylic acid is particularly preferred because the compound is colorless, increases the charging speed of the toner, and can stably hold a constant charge quantity.

As a negative charge control agent, there are given, for example: a salicylic acid metal compound; a naphthoic acid metal compound; a dicarboxylic acid metal compound; a polymer-type compound having a sulfonic acid or a carboxylic acid in a side chain thereof; a polymer-type compound having a sulfonate or a sulfonic acid esterified product in a side chain thereof; a polymer-type compound having a carboxylate or a carboxylic acid esterified product in a side chain thereof; a boron compound; a urea compound; a silicon compound; and a calixarene.

The charge control agent may be internally added to the toner particle, or may be externally added thereto. The content of the charge control agent is preferably 0.2 part by mass or more and 10.0 parts by mass or less, more preferably 0.5 part by mass or more and 10.0 parts by mass or less with respect to 100 parts by mass of the binder resin.

<External Additive>

An external additive may be added to the toner particle as required. Examples of the external additive include: inorganic granules made of silica, alumina, titania, and calcium carbonate; and resin particles made of a vinyl-based resin, a polyester resin, and a silicone resin.

<Method of Producing Toner>

A method of producing the toner is not particularly limited, and known methods, such as an emulsion aggregation method, a kneading pulverization method, and a suspension polymerization method, may each be used. Of those, the kneading pulverization method is preferred. The kneading pulverization method is described below.

First, predetermined amounts of, for example, the binder resin, the crystalline resin, and the C.I. Pigment Yellow 180, and as required, any other component, such as calcium carbonate particles or the releasing agent, serving as materials for forming the toner particles are weighed, and the materials are blended and mixed. A mixing apparatus is, for example, a double cone mixer, a V-type mixer, a drum-type mixer, a super mixer, a Henschel mixer, a Nauta mixer, or MECHANO HYBRID (manufactured by Nippon Coke & Engineering Co., Ltd.).

Next, the mixed materials are melt-kneaded. In the melt-kneading step, a batch-type kneader, such as a pressure kneader or a Banbury mixer, or a continuous kneader may be used, and a single-screw or twin-screw extruder is preferred because of the following superiority: the extruder can perform continuous production. The temperature for the melt-kneading is preferably from about 100° C. to about 200° C.

A kneading apparatus to be used is, for example, a KTK-type twin-screw extruder (manufactured by Kobe Steel, Ltd.), a TEM-type twin-screw extruder (manufactured by Toshiba Machine Co., Ltd.), a PCM kneader (manufactured by Ikegai Ironworks Corporation), a twin-screw extruder (manufactured by K.C.K.), a co-kneader (manufactured by Buss Corporation), or KNEADEX (manufactured by Nippon Coke & Engineering Co., Ltd.). Further, a resin composition obtained by the melt-kneading is rolled with a twin-roll mill or the like, and is rapidly cooled with water or the like in a cooling step.

Next, the cooled product of the resin composition is pulverized into a desired particle diameter in a pulverizing step. In the pulverizing step, the cooled product is coarsely pulverized with a pulverizer, such as a crusher, a hammer mill, or a feather mill, and is then further finely pulverized with, for example, KRYPTRON SYSTEM (manufactured by Kawasaki Heavy Industries, Ltd.), SUPER ROTOR (manufactured by Nisshin Engineering Inc.), TURBO MILL (manufactured by Turbo Kogyo Co., Ltd.), or a fine pulverizer based on an air jet system, to provide a toner particle.

After that, as required, the toner particle may be classified with a classifier or a sifter, such as ELBOW-JET (manufactured by Nittetsu Mining Co., Ltd.) based on an inertial classification system, or TURBOPLEX (manufactured by Hosokawa Micron Corporation), TSP SEPARATOR (manufactured by Hosokawa Micron Corporation), or FACULTY (manufactured by Hosokawa Micron Corporation) based on a centrifugal force classification system, to provide a classified toner particle.

The weight-average particle diameter of the toner particles is preferably 4 μm or more and 12 μm or less, more preferably 51 μm or more and 8 μm or less. The toner particles produced through the above-mentioned steps may be used as they are as the toner. Inorganic fine particles made of, for example, silica, alumina, titania, and calcium carbonate, or resin fine particles made of, for example, a vinyl-based resin, a polyester resin, and a silicone resin may be added as required to the toner particles by applying a shear force in a dry state. Those inorganic fine particles or resin fine particles function as an external additive, such as a flowability aid or a cleaning aid. The content of the external additive is preferably 1.0 part by mass or more and 10.0 parts by mass or less, more preferably 2.0 parts by mass or more and 5.0 parts by mass or less with respect to 100 parts by mass of the toner particles.

<Developer>

Although the toner may be used as a one-component developer, the toner may be used as a two-component developer by being mixed with a magnetic carrier. Generally known carriers may be used as the magnetic carrier, and examples of the magnetic carrier include: surface-oxidized iron powder or unoxidized iron powder; particles of metals, such as iron, lithium, calcium, magnesium, nickel, copper, zinc, cobalt, manganese, and rare earths, and particles made of alloys thereof or particles made of oxides thereof; a magnetic material such as ferrite; and a magnetic material-dispersed resin carrier (so-called resin carrier) containing a magnetic material and a binder resin holding the magnetic material under a state in which the magnetic material is dispersed therein.

When the toner is used as a two-component developer by being mixed with the magnetic carrier, a carrier mixing ratio at this time is set to preferably 2% by mass or more and 15% by mass or less, more preferably 4% by mass or more and 13% by mass or less in terms of toner concentration in the two-component developer because a satisfactory result is typically obtained.

[Methods of Measuring Respective Physical Properties]

Methods of measuring respective physical properties according to the present disclosure are described below.

<Shape of C.I. Pigment Yellow 180>

The shape of the C.I. Pigment Yellow 180 is measured as described below.

First, the C.I. Pigment Yellow 180 can be separated from the toner particles by Procedure 1 described below.

(Procedure 1)

To 100 mL of ion-exchanged water, 160 g of sucrose is added and is dissolved therein while a vessel containing the materials is warmed in hot water. Thus, a sucrose heavy solution is prepared. Into a tube for centrifugation, 31 g of the sucrose heavy solution and 6 mL of a surfactant are loaded to produce a dispersion liquid. To the dispersion liquid, 2.0 g of the toner is added and the lump of the toner is loosened with a spatula. Next, the tube for centrifugation is shaken with a shaker. After the shaking, a precipitate is removed from the solution by centrifugation with a centrifuge under the conditions of 3,500 rpm, 30 minutes, and a radius of rotation of 3 cm. The floating solid content is filtered with a vacuum filter, then dried with a dryer for 1 hour or more, and 1 g of the resultant solid content is dissolved in 20 mL of tetrahydrofuran. The solution is centrifuged at 15,000 rpm and a radius of rotation of 3 cm for 180 minutes, followed by the removal of the supernatant. Further, 20 mL of tetrahydrofuran is added to the residue, and the same operation is repeated twice. Further, 20 mL of tetrahydrofuran is added to the precipitated solid content, and the mixture is cast on the sample stage of an electron microscope and dried. Thus, an observation sample is obtained.

The surfactant is, for example, Contaminon N (manufactured by Wako Pure Chemical Industries, Ltd.). The Contaminon N is a 10% by mass aqueous solution of a neutral detergent for washing a precision measuring unit, the solution being formed of a nonionic surfactant, an anionic surfactant, and an organic builder, and having a pH of 7.

YS-LD manufactured by Yayoi Corporation is used as the shaker, and the shaking is performed under the conditions of 200 rpm and 1 minute. FRONT LABO FLD2012 (manufactured by AS ONE Corporation) is used as the centrifuge.

The sample produced by Procedure 1 described above is observed with a scanning electron microscope (S-4800, Hitachi High-Technologies Corporation), and the number average S (nm) of the circle-equivalent diameters of its surface portions is calculated as described below.

The particles of the C.I. Pigment Yellow 180 are observed with the electron microscope, and the longest diameter in the plate direction of each of the plate-like particles, the shortest diameter therein, and the thickness thereof are measured as a major axis X, a minor axis Y, and a thickness Z, respectively. Herein, a sample stage having such a shape that its upper half surface is subjected to digging processing into the right angle may be used in observation in the thickness direction of the particle.

The radius of a circle having the same area as the area of an ellipse determined from the expression "(major axis X)/2×(minor axis Y)/2×π" is calculated. Double of the obtained radius is adopted as the circle-equivalent diameter. The same operation is performed on 100 particles, and the number average S of the circle-equivalent diameters of the surface portions is obtained by determining the arithmetic average of their circle-equivalent diameters.

<Measurement of Content of C.I. Pigment Yellow 180 in Toner>

The content of the C.I. Pigment Yellow 180 to be incorporated into the toner is measured as follows: 10 g of the toner is subjected to Procedure 1 described above, and the content is measured from the ratio of the amount of the remaining solid content to the initial loading amount, that is, 10 g.

<Identification of Content of Crystalline Resin in Toner>

The content of the crystalline resin can be determined by separating the crystalline resin from the toner through utilization of a difference in solubility in a solvent between the resin and any other component as described below.

First separation: The toner is dissolved in methyl ethyl ketone (MEK) at 23° C. to be separated into soluble matter (the binder resin) and insoluble matter (the crystalline polyester resin, a releasing agent, an organic pigment, inorganic fine particles, and the like).

Second separation: The insoluble matter (the crystalline resin, the releasing agent, the organic pigment, the inorganic fine particles, and the like) obtained in the first separation is dissolved in MEK at 100° C. to be separated into soluble matter (the crystalline resin and the releasing agent) and insoluble matter (the organic pigment, the inorganic fine particles, and the like).

Third separation: The soluble matter (the crystalline resin and the releasing agent) obtained in the second separation is dissolved in chloroform at 23° C. Thus, the crystalline resin is separated as soluble matter. After the solvent has been sufficiently dried and removed, the mass of the residue is measured. Thus, the content of the crystalline resin can be determined.

<Identification of Monomers of Crystalline Resin>

The structure of the crystalline resin is analyzed with a pyrolysis gas chromatography mass spectrometer (GCMS) as described below. In the following pyrofoil F590, 300 μg of the solid content of the resin separated from the toner by the above-mentioned method is embedded, and is introduced into the pyrolyzer. The embedded resin is heated in an inert (helium) atmosphere at 590° C. for 5 seconds, and a generated decomposed gas is introduced into the injection port of the gas chromatography mass spectrometer, followed by the performance of the following oven profile. A column outlet is connected to the MS analyzer through a transfer line, and a total ion chromatogram (TIC) in which an ion current is plotted against an axis of ordinate and a retention time is plotted against an axis of abscissa is obtained. Next, the mass spectra of all detected peaks in the resultant chromatogram are extracted with software attached to the GCMS, and compounds for forming the resin are assigned to the mass spectra based on the NIST-2017 database.

Measuring apparatus and measurement conditions are as described below.

Pyrolyzer: Japan Analytical Industry JSP900 (manufactured by Japan Analytical Industry Co., Ltd.)

Pyrofoil: F590 (manufactured by Japan Analytical Industry Co., Ltd.)

GC: Agilent Technologies 7890A GC

MS: Agilent Technologies 5975C

Column: HP-5 ms 30 m, inner diameter: 0.25 mm, mobile phase thickness: 0.25 μm (manufactured by Agilent Technologies Corporation)

Carrier gas: He (purity: 99.9995% or more)

Oven profile: (1) The temperature is held at 40° C. for 3 minutes, (2) the temperature is increased to 320° C. at 10° C./minute, and (3) the temperature is held at 320° C. for 20 minutes.

Injection port temperature: 280° C.

Split ratio: 50:1

Colum flow rate: 1 mL/min (constant)

Transfer line temperature: 280° C.

Range to be observed with MS: From 30 to 600 Da

Ionization: EI 70 eV

Ion source temperature: 280° C.

Quadrupole temperature: 150° C.

<Measurement of X-Ray Diffraction Measurement Peak of Toner>

The X-ray diffraction measurement of the toner is performed with a measuring apparatus "RINT-TTRII" (manufactured by Rigaku Corporation) and a CuKα characteristic X-ray in the diffraction angle (2θ) range of from 3 degrees to 35 degrees. The value of the ratio of a peak intensity assigned to a diffraction angle (2θ) of 13.5°±0.1° to a peak intensity assigned to a diffraction angle (2θ) of 6.5°±0.1° is determined from the total integrated intensity of the resultant spectrum. The toner is used as a sample. When the influence of the external additive of the toner needs to be eliminated, the external additive can be removed by the operations up to the centrifugation at 3,500 rpm in (Procedure 1) described above, and hence the toner particles from which the external additive has been removed by the operations may also be used as the sample. Measurement conditions are as described below.

X-ray: Cu/50 kV/300 mA

Goniometer: A rotor horizontal goniometer (TTR-2)

Attachment: A standard sample holder

Divergence slit: Open

Divergence vertical limiting slit: 10.00 mm

Scattering slit: Open

Light-receiving slit: Open

Counter: A scintillation counter

Scan mode: Continuous

Scan speed: 4.0000°/min.

Sampling width: 0.0200°

Scan axis: 2θ/θ

Scan range: From 10.0000° to 40.0000°

<Method of Measuring Acid Value of Crystalline Resin>

The term "acid value" refers to the number of milligrams of potassium hydroxide required for the neutralization of an acid in 1 g of a sample. Measurement is performed in conformity with JIS K 0070-1992. Specifically, the acid value of the crystalline resin, or the crystalline resin separated from the toner by the above-mentioned method is measured in accordance with the following procedure.

(1) Preparation of Reagents

In 90 mL of ethyl alcohol (95 vol %), 1.0 g of phenolphthalein is dissolved, and ion-exchanged water is added to make 100 mL to provide a phenolphthalein solution. In 5 mL of water, 7 g of special-grade potassium hydroxide is dissolved, and ethyl alcohol (95 vol %) is added to make 1 L. The resultant is placed in an alkali-resistant container so as not to be brought into contact with a carbon dioxide gas or the like, and is left to stand therein for 3 days, followed by filtration to provide a potassium hydroxide solution. The resultant potassium hydroxide solution is stored in an alkali-resistant container. The factor of the potassium hydroxide solution is determined from the amount of the potassium hydroxide solution required for neutralization when 25 mL of 0.1 mol/L hydrochloric acid is taken in an Erlenmeyer flask and a few drops of the phenolphthalein solution are added, followed by titration with the potassium hydroxide solution. The 0.1 mol/L hydrochloric acid to be used is produced in conformity with JIS K 8001-1998.

(2) Operations (A) Main Test

In a 200 mL Erlenmeyer flask, 2.0 g of a sample of the pulverized crystalline resin is precisely weighed and is dissolved by adding 100 mL of a mixed solution of toluene/ethanol (2:1) over 5 hours. Then, a few drops of the phenolphthalein solution are added as an indicator, and titration is performed with the potassium hydroxide solution. The endpoint of the titration is defined as the point where a pale pink color of the indicator persists for about 30 seconds.

(B) Blank Test

Titration is performed in the same manner as in the above-mentioned operation except that no sample is used (that is, only the mixed solution of toluene/ethanol (2:1) is used).

(3) the Acid Value is Calculated by Substituting the Obtained Results into the Following Equation:

$$A=[(C-B)\times f\times 5.61]/S$$

where A represents the acid value (mgKOH/g), B represents the addition amount (mL) of the potassium hydroxide solution in the blank test, C represents the addition amount (mL) of the potassium hydroxide solution in the main test, "f" represents the factor of the potassium hydroxide solution, and S represents the mass (g) of the sample.

<Methods of Identifying Amount and Structure of Nonionic Surfactant in Toner>

First, the nonionic surfactant is separated from the toner by the following procedure.

To 100 mL of ion-exchanged water, 160 g of sucrose is added and is dissolved therein while a vessel containing the materials is warmed in hot water. Thus, a sucrose heavy solution is prepared. Into a tube for centrifugation, 310 g of the sucrose heavy solution and 60 mL of a surfactant are loaded to produce a dispersion liquid. To the dispersion liquid, 20.0 g of the toner is added, and the lump of the toner is loosened with a spatula. Next, the tube for centrifugation is shaken with a shaker. After the shaking, a precipitate is removed from the solution by centrifugation with a centrifuge under the conditions of 3,500 rpm, 30 minutes, and a radius of rotation of 3 cm. The floating solid content is filtered with a vacuum filter, and is then washed with 1,000 ml of water, followed by drying with a dryer for 1 hour or more. In 100 ml of toluene, 10 g of the resultant solid content is dispersed, and 50 ml of water and 50 ml of methanol are added to separate the resultant liquid. The aqueous layer is fractionated, and is dried and solidified to provide the nonionic surfactant incorporated into the toner.

Next, the structure of the resultant solid content is identified by a known analysis method, such as X-ray diffraction, GC/MS, LC/MS, or IR measurement, in addition to NMR measurement. After that, the calibration curve of the LC/MS measurement is prepared by using the compound whose structure has been able to be identified.

The content of the nonionic surfactant is calculated by subjecting the solid content obtained in the foregoing to the LC/MS measurement.

(LC/MS Analysis Conditions)

Model: Agilent 1200SL-HPLC/6130MSD (manufactured by Agilent Technologies Corporation)

Column: ZORBAX Eclipse Plus C18 (1.811 m, 100 mm×4.6 mm I.D) (manufactured by Agilent Technologies Corporation)

Eluent: MeOH/$H_2O$ (0.1 vol % formic acid)=90/10

Flow rate: 1.0 mL/min

Column temperature: 30° C.

<Method of Measuring Weight-Average Particle Diameter (D4) of Toner Particle or Toner>

The weight-average particle diameter (D4) of the toner particle or the toner is measured with the number of effective measurement channels of 25,000 by using a precision particle size distribution-measuring apparatus based on a pore electrical resistance method provided with a 100 μm aperture tube "Coulter Counter Multisizer 3" (trademark, manufactured by Beckman Coulter, Inc.) and dedicated software included therewith "Beckman Coulter Multisizer 3 Version 3.51" (manufactured by Beckman Coulter, Inc.) for setting measurement conditions and analyzing measurement data. Then, the measurement data is analyzed to calculate the diameter.

An electrolyte aqueous solution prepared by dissolving special-grade sodium chloride in ion-exchanged water so as to have a concentration of about 1% by mass, such as "ISOTON II" (manufactured by Beckman Coulter, Inc.), may be used in the measurement.

The dedicated software is set as described below prior to the measurement and the analysis.

In the "change standard measurement method (SOM)" screen of the dedicated software, the total count number of a control mode is set to 50,000 particles, the number of times of measurement is set to 1, and a value obtained by using "standard particles each having a particle diameter of 10.0 μm" (manufactured by Beckman Coulter, Inc.) is set as a Kd value. A threshold and a noise level are automatically set by pressing a threshold/noise level measurement button. In addition, a current is set to 1,600 μA, a gain is set to 2, and an electrolyte solution is set to ISOTON II, and a check mark is placed in a check box as to whether the aperture tube is flushed after the measurement.

In the "setting for conversion from pulse to particle diameter" screen of the dedicated software, a bin interval is set to a logarithmic particle diameter, the number of particle diameter bins is set to 256, and a particle diameter range is set to the range of 2 μm or more and 60 μm or less.

A specific measurement method is as described below.

(1) About 200 ml of the electrolyte aqueous solution is charged into a 250 mL round-bottom beaker made of glass dedicated for the Multisizer 3. The beaker is set in a sample stand, and the electrolyte aqueous solution in the beaker is stirred with a stirrer rod at 24 rotations/sec in a counterclockwise direction. Then, dirt and bubbles in the aperture tube are removed by the "aperture flush" function of the analytical software.

(2) About 30 mL of the electrolyte aqueous solution is charged into a 100-mL flat-bottom beaker made of glass. About 0.3 mL of a diluted solution prepared by diluting "Contaminon N" (a 10% by mass aqueous solution of a neutral detergent for washing a precision measuring device formed of a nonionic surfactant, an anionic surfactant, and an organic builder and having a pH of 7 manufactured by Wako Pure Chemical Industries, Ltd.) with ion-exchanged water by three mass fold is added as a dispersant to the electrolyte aqueous solution.

(3) A predetermined amount of ion-exchanged water is charged into the water tank of an ultrasonic dispersing unit "Ultrasonic Dispersion System Tetora 150" (manufactured by Nikkaki Bios Co., Ltd.) having an electrical output of 120 W in which two oscillators each having an oscillatory frequency of 50 kHz are built so as to be out of phase by 180°. About 2 ml of the Contaminon N is charged into the water tank.

(4) The beaker in the section (2) is set in the beaker fixing hole of the ultrasonic dispersing unit, and the ultrasonic dispersing unit is operated. Then, the height position of the beaker is adjusted so that the resonance state of the liquid level of the electrolyte aqueous solution in the beaker is maximized.

(5) About 10 mg of toner is gradually added to and dispersed in the electrolyte aqueous solution in the beaker in the section (4) under a state in which the electrolyte aqueous solution is irradiated with the ultrasonic wave. Then, the ultrasonic dispersion treatment is continued for an additional 60 seconds. The temperature of water in the water tank is appropriately adjusted to 10° C. or more and 40° C. or less in the ultrasonic dispersion.

(6) The electrolyte aqueous solution in the section (5) in which the toner has been dispersed is dropped with a pipette to the round-bottom beaker in the section (1) placed in the sample stand, and the concentration of the toner to be measured is adjusted to about 5%. Then, measurement is performed until the particle diameters of 50,000 particles are measured.

(7) The measurement data is analyzed with the dedicated software included with the apparatus, and the weight-average particle diameter (D4) is calculated. An "average diameter" on the "analysis/volume statistics (arithmetic average)" screen of the dedicated software when the dedicated software is set to show a graph in a vol % unit is the weight-average particle diameter (D4).

EXAMPLES

The present disclosure is specifically described by way of the following Examples. However, the present disclosure is by no means limited thereto. In the following formulations, the term "part(s)" always means "part(s) by mass" unless otherwise specified.

Production Example of Pigment 1

(1) Production of Diazo Component 1,2-Bis-(2-aminophenoxy)-ethane: 100.0 parts

Water: 1,000.0 parts

The above-mentioned materials were weighed in a reaction vessel including a stirring machine. Next, 200.0 parts of 35% hydrochloric acid was added to the mixture, and the whole was stirred for 1 hour. After that, 120.0 parts of a 38% solution of sodium nitrite was dropped to diazotize the mixture, and the diazotized product was filtered by causing activated carbon or the like to adsorb impurities.

(2) Production of Coupling Component

5-Acetoacetylamino-benzimidazolone: 210.0 parts

Water: 2,000.0 parts

The above-mentioned materials were weighed in a reaction vessel including a stirring machine. Next, 250.0 parts of 30% caustic soda was added to the mixture, and the whole was stirred for 1 hour. The mixture was filtered, and the amount of the filtrate was adjusted to 3,000.0 parts with water and ice, followed by the addition of 200.0 parts of 80% acetic acid while its temperature was kept at 5° C.

The components obtained in the above-mentioned sections (1) and (2) were mixed at room temperature, and then the mixture was stirred for 7 hours. The resultant reaction liquid was filtered and washed, and was then dried with a dryer for 48 hours to provide Pigment Yellow 180.

After weighing 1.0 part of the Pigment Yellow 180 obtained in the foregoing, 0.02 part of a polyoxyethylene alkyl ether was added thereto, followed by the dispersion of the mixture in 10.0 parts of toluene. The dispersed product was treated with a ball mill (MM400, manufactured by Verder Scientific Co., Ltd.) under the conditions of 30 minutes and 20 Hz. The resultant Pigment Yellow 180 was filtered, and was dried and solidified to provide a pigment 1.

Production Examples of Pigments 2 to 11

Pigments 2 to 11 were each obtained by performing treatment with the ball mill in the same manner as that described above except that the conditions for the treatment were changed as shown in Table 1.

Production Example of Pigment 12

After weighing 1.0 part of the Pigment Yellow 180 obtained in the production example of the pigment 1, 0.02 part of a polyoxyethylene alkyl ether was added thereto, followed by the dispersion of the mixture in 10.0 parts of toluene. The materials were mixed with a mix rotor at room temperature for 24 hours. After that, the mixture was filtered, and was dried and solidified to provide a pigment 12.

TABLE 1

| | Treatment condition | | | | | | | Shape | | |
|---|---|---|---|---|---|---|---|---|---|---|
| | Pigment | | Toluene | Nonionic surfactant | | Ball mill treatment | | | | |
| Pigment No. | Structure | Blending amount [part(s) by mass] | Blending amount [part(s) by mass] | Kind | Blending amount [part(s) by mass] | Treatment time [min] | Treatment frequency [Hz] | S/Z | Z [nm] | S [nm] |
| Pigment 1 | PY180 | 10 | 100 | Polyoxyethylene alkyl ether | 0.02 | 30 | 15 | 15.4 | 13 | 200 |
| Pigment 2 | PY180 | 10 | 100 | Polyoxyethylene polyoxypropylene glycol | 0.02 | 30 | 15 | 15.4 | 13 | 200 |
| Pigment 3 | PY180 | 10 | 100 | Polyoxyethylene alkyl ether | 0.012 | 30 | 15 | 15.4 | 13 | 200 |

TABLE 1-continued

| | Treatment condition | | | | | | | | | |
|---|---|---|---|---|---|---|---|---|---|---|
| | Pigment | | Toluene | Nonionic surfactant | | Ball mill treatment | | Shape | | |
| Pigment No. | Structure | Blending amount [part(s) by mass] | Blending amount [part(s) by mass] | Kind | Blending amount [part(s) by mass] | Treatment time [min] | Treatment frequency [Hz] | S/Z | Z [nm] | S [nm] |
| Pigment 4 | PY180 | 10 | 100 | Polyoxyethylene alkyl ether | 0.048 | 30 | 15 | 15.4 | 13 | 200 |
| Pigment 5 | PY180 | 10 | 100 | Polyoxyethylene alkyl ether | 0.008 | 30 | 15 | 15.4 | 13 | 200 |
| Pigment 6 | PY180 | 10 | 100 | Polyoxyethylene alkyl ether | 0.055 | 30 | 15 | 15.4 | 13 | 200 |
| Pigment 7 | PY180 | 10 | 100 | Polyoxyethylene alkyl ether | 0.02 | 30 | 10 | 11.1 | 18 | 200 |
| Pigment 8 | PY180 | 10 | 100 | Polyoxyethylene alkyl ether | 0.02 | 40 | 20 | 10.0 | 8 | 80 |
| Pigment 9 | PY180 | 10 | 100 | Polyoxyethylene alkyl ether | 0.02 | 30 | 15 | 14.0 | 20 | 280 |
| Pigment 10 | PY180 | 10 | 100 | Polyoxyethylene alkyl ether | 0.02 | 40 | 30 | 8.0 | 5 | 40 |
| Pigment 11 | PY180 | 10 | 100 | Polyoxyethylene alkyl ether | 0.02 | 20 | 15 | 16.0 | 20 | 320 |
| Pigment 12 | PY180 | 10 | 100 | Polyoxyethylene alkyl ether | 0.02 | No treatment | | 5.0 | 40 | 200 |

Production Example of Crystalline Resin 1

Ethylene glycol: 28.0 parts

Dodecanedioic acid: 72.0 parts

Titanium tetrabutoxide (esterification catalyst): 0.5 part

The above-mentioned materials were weighed in a reaction vessel including a condenser, a stirring machine, a nitrogen-introducing tube, and a thermocouple. Next, the inside of the flask was purged with a nitrogen gas, and then a temperature in the flask was gradually increased while the mixture was stirred. The mixture was subjected to a reaction for 2 hours while being stirred at a temperature of 200° C.

Further, a pressure in the reaction vessel was reduced to 8.3 kPa, and the contents were subjected to a reaction for 5 hours while the temperature was maintained at 200° C. After that, the temperature was reduced to stop the reaction. Thus, a crystalline resin 1 was obtained. The resultant resin had an acid value of 10.0 mgKOH/g.

Production Example of Crystalline Resin 2

Ethylene glycol: 32.0 parts

Decanedioic acid: 68.0 parts

Titanium tetrabutoxide: 0.5 part

The above-mentioned materials were weighed in a reaction vessel including a condenser, a stirring machine, a nitrogen-introducing tube, and a thermocouple. Next, the inside of the flask was purged with a nitrogen gas, and then a temperature in the flask was gradually increased while the mixture was stirred. The mixture was subjected to a reaction for 2 hours while being stirred at a temperature of 200° C.

Further, a pressure in the reaction vessel was reduced to 8.3 kPa, and the contents were subjected to a reaction for 5 hours while the temperature was maintained at 200° C. After that, the temperature was reduced to stop the reaction. Thus, a crystalline resin 2 was obtained. The resultant resin had an acid value of 9.5 mgKOH/g.

Production Example of Crystalline Resin 3

Hexanediol: 53.0 parts

Hexanedioic acid: 47.0 parts

Titanium tetrabutoxide: 0.5 part

The above-mentioned materials were weighed in a reaction vessel including a condenser, a stirring machine, a nitrogen-introducing tube, and a thermocouple. Next, the inside of the flask was purged with a nitrogen gas, and then a temperature in the flask was gradually increased while the mixture was stirred. The mixture was subjected to a reaction for 2 hours while being stirred at a temperature of 200° C.

Further, a pressure in the reaction vessel was reduced to 8.3 kPa, and the contents were subjected to a reaction for 5 hours while the temperature was maintained at 200° C. After that, the temperature was reduced to stop the reaction. Thus, a crystalline resin 3 was obtained. The resultant resin had an acid value of 10.2 mgKOH/g.

Production Example of Crystalline Resin 4

Ethylene glycol: 28.0 parts

Dodecanedioic acid: 72.0 parts

Titanium tetrabutoxide (esterification catalyst): 0.5 part

The above-mentioned materials were weighed in a reaction vessel including a condenser, a stirring machine, a nitrogen-introducing tube, and a thermocouple. Next, the inside of the flask was purged with a nitrogen gas, and then a temperature in the flask was gradually increased while the mixture was stirred. The mixture was subjected to a reaction for 2 hours while being stirred at a temperature of 200° C.

Further, a pressure in the reaction vessel was reduced to 8.3 kPa, and the contents were subjected to a reaction for 3 hours while the temperature was maintained at 200° C. After that, the temperature was reduced to stop the reaction. Thus, a crystalline resin 4 was obtained. The resultant resin had an acid value of 28.8 mgKOH/g.

Production Example of Crystalline Resin 5

Ethylene glycol: 28.0 parts
Dodecanedioic acid: 72.0 parts
Titanium tetrabutoxide (esterification catalyst): 0.5 part The above-mentioned materials were weighed in a reaction vessel including a condenser, a stirring machine, a nitrogen-introducing tube, and a thermocouple. Next, the inside of the flask was purged with a nitrogen gas, and then a temperature in the flask was gradually increased while the mixture was stirred. The mixture was subjected to a reaction for 2 hours while being stirred at a temperature of 200° C.

Further, a pressure in the reaction vessel was reduced to 8.3 kPa, and the contents were subjected to a reaction for 6 hours while the temperature was maintained at 200° C. After that, the temperature was reduced to stop the reaction. Thus, a crystalline resin 5 was obtained. The resultant resin had an acid value of 7.1 mgKOH/g.

Production Example of Crystalline Resin 6

Ethylene glycol: 28.0 parts
Dodecanedioic acid: 72.0 parts
Titanium tetrabutoxide (esterification catalyst): 0.5 part The above-mentioned materials were weighed in a reaction vessel including a condenser, a stirring machine, a nitrogen-introducing tube, and a thermocouple. Next, the inside of the flask was purged with a nitrogen gas, and then a temperature in the flask was gradually increased while the mixture was stirred. The mixture was subjected to a reaction for 2 hours while being stirred at a temperature of 200° C.

Further, a pressure in the reaction vessel was reduced to 8.3 kPa, and the contents were subjected to a reaction for 2 hours while the temperature was maintained at 200° C. After that, the temperature was reduced to stop the reaction. Thus, a crystalline resin 6 was obtained. The resultant resin had an acid value of 47.3 mgKOH/g.

Production Example of Crystalline Resin 7

Ethylene glycol: 28.0 parts
Dodecanedioic acid: 72.0 parts
Titanium tetrabutoxide (esterification catalyst): 0.5 part The above-mentioned materials were weighed in a reaction vessel including a condenser, a stirring machine, a nitrogen-introducing tube, and a thermocouple. Next, the inside of the flask was purged with a nitrogen gas, and then a temperature in the flask was gradually increased while the mixture was stirred. The mixture was subjected to a reaction for 2 hours while being stirred at a temperature of 200° C.

Further, a pressure in the reaction vessel was reduced to 8.3 kPa, and the contents were subjected to a reaction for 8 hours while the temperature was maintained at 200° C. After that, the temperature was reduced to stop the reaction. Thus, a crystalline resin 7 was obtained. The resultant resin had an acid value of 5.3 mgKOH/g.

Production Example of Crystalline Resin 8

| | |
|---|---|
| Toluene | 100.0 parts |
| Behenyl acrylate | 50.0 parts |
| Styrene | 30.0 parts |
| Acrylonitrile | 15.0 parts |
| 2-Hydroxyethyl acrylate | 5.0 parts |
| Polymerization initiator | 0.5 part |

[t-Butyl peroxypivalate (manufactured by NOF Corporation: PERBUTYL PV)]

Under a nitrogen atmosphere, the above-mentioned materials were loaded into a reaction vessel including a reflux condenser, a stirring machine, a temperature gauge, and a nitrogen-introducing tube. While being stirred at 200 rpm, the contents of the reaction vessel were heated to 70° C. and subjected to a polymerization reaction for 15 hours to provide a solution in which a polymer of the monomer composition was dissolved in toluene.

Subsequently, the temperature of the solution was decreased to 25° C., and then the solution was charged into 1,000.0 parts of methanol under stirring to precipitate methanol-insoluble matter. The resultant methanol-insoluble matter was separated by filtration, further washed with methanol, and then vacuum-dried at 40° C. for 24 hours. Thus, a crystalline resin 8 was obtained. The resultant resin had an acid value of 9.7 mgKOH/g.

Production Example of Yellow Pigment Master Batch YM1

| | |
|---|---|
| Pigment 1 | 40 parts |
| Amorphous polyester resin 1 | 60 parts |

(Amorphous polyester resin 1: composition (mol %) [polyoxypropylene(2.2)-2,2-bis(4-hydroxyphenyl)propane: isophthalic acid:terephthalic acid=100:50:50], softening temperature (Tm)=122° C., glass transition temperature (Tg)=70°) C.)

The above-mentioned materials were mixed with a Henschel mixer (Model FM-75, manufactured by Mitsui Mining Co., Ltd.) at a number of rotations of 20 $s^{-1}$ for a time of rotation of 5 min. After that, the mixture was kneaded with a twin-screw kneader (Model PCM-30, manufactured by Ikegai Corp.) at a temperature of 120° C. The resultant kneaded product was cooled, and was coarsely pulverized with a pin mill to a volume-average particle diameter of 100 μm or less. Thus, a coarsely pulverized product of a yellow pigment master batch YM1 was obtained.

Production Examples of Yellow Pigment Master Batches YM2 to YM12

Yellow pigment master batches YM2 to YM12 were each obtained by performing production in the same manner as in the yellow pigment master batch YM1 except that the pigment was changed to a material shown in Table 2.

Production Example of Yellow Pigment Master Batch YM13

A yellow pigment master batch YM13 was obtained by performing production in the same manner as in the yellow pigment master batch YM1 except that the kind of the pigment was changed to Pigment Yellow 74 (product name: Hansa Yellow 5GX01, manufactured by Clariant Chemicals Corporation, S=60 nm, Z=50 nm, S/Z=1.2).

Production Example of Yellow Pigment Master Batch YM14

A yellow pigment master batch YM14 was obtained by performing production in the same manner as in the yellow pigment master batch YM1 except that the kind of the pigment was changed to Pigment Yellow 74 (product name: Toner Yellow 5GXT, manufactured by Clariant Chemicals Corporation, S=200 nm, Z=40 nm, S/Z=5.0).

TABLE 2

| Master batch No. | Amorphous polyester resin 1 | Blending amount [part(s) by mass] | Pigment | Blending amount [part(s) by mass] | Pigment concentration |
|---|---|---|---|---|---|
| YM1 | Amorphous polyester resin 1 | 60 | Pigment 1 | 40 | 40% |
| YM2 | Amorphous polyester resin 1 | 60 | Pigment 2 | 40 | 40% |
| YM3 | Amorphous polyester resin 1 | 60 | Pigment 3 | 40 | 40% |
| YM4 | Amorphous polyester resin 1 | 60 | Pigment 4 | 40 | 40% |
| YM5 | Amorphous polyester resin 1 | 60 | Pigment 5 | 40 | 40% |
| YM6 | Amorphous polyester resin 1 | 60 | Pigment 6 | 40 | 40% |
| YM7 | Amorphous polyester resin 1 | 60 | Pigment 7 | 40 | 40% |
| YM8 | Amorphous polyester resin 1 | 60 | Pigment 8 | 40 | 40% |
| YM9 | Amorphous polyester resin 1 | 60 | Pigment 9 | 40 | 40% |
| YM10 | Amorphous polyester resin 1 | 60 | Pigment 10 | 40 | 40% |
| YM11 | Amorphous polyester resin 1 | 60 | Pigment 11 | 40 | 40% |
| YM12 | Amorphous polyester resin 1 | 60 | Pigment 12 | 40 | 40% |
| YM13 | Amorphous polyester resin 1 | 60 | Hansa Yellow 5GX01 | 40 | 40% |
| YM14 | Amorphous polyester resin 1 | 60 | Toner Yellow 5GXT | 40 | 40% |

Production Example of Yellow Toner YT1

Amorphous polyester resin 1:67 parts
Crystalline resin 1:5 parts
Yellow pigment master batch YM1:20 parts
Wax 1:8 parts (Hydrocarbon wax, peak temperature of the highest endothermic peak: 90° C.)

The above-mentioned materials were mixed with a Henschel mixer (Model FM-75, manufactured by Mitsui Mining Co., Ltd.) at a number of rotations of 20 $s^{-1}$ for a time of rotation of 5 min. After that, the mixture was kneaded with a twin-screw kneader (Model PCM-30, manufactured by Ikegai Corp.) at a preset temperature of 130° C. The resultant kneaded product was cooled, and was coarsely pulverized with a pin mill to a volume-average particle diameter of 100 μm or less. Thus, a coarsely pulverized product was obtained. The resultant coarsely pulverized product was finely pulverized with a mechanical pulverizer (T-250, manufactured by Turbo Kogyo Co., Ltd.) while its number of rotations and number of times of passage were adjusted so that a target particle diameter was obtained. Further, the finely pulverized product was classified with a rotary classifier (200TSP, manufactured by Hosokawa Micron Corporation). Thus, toner particles were obtained.

With regard to a condition under which the rotary classifier (200TSP, manufactured by Hosokawa Micron Corporation) was operated, the classification was performed while its number of rotations was adjusted so that a target particle diameter and a target particle size distribution were obtained. To 100 parts of the resultant toner particles, 1.8 parts by mass of silica fine particles, which had a specific surface area measured by a BET method of 200 $m^2/g$ and had been subjected to hydrophobic treatment with a silicone oil, were added, and the materials were mixed with a Henschel mixer (Model FM-75, manufactured by Mitsui Mining Co., Ltd.) at a number of rotations of 30 $s^{-1}$ for a time of rotation of 10 min to provide a yellow toner YT1.

Production Examples of Yellow Toners YT2 to YT32

Yellow toners YT2 to YT32 were each obtained by performing production in the same manner as in the yellow toner YT1 except that the materials were changed as shown in Table 3-1 and Table 3-2.

TABLE 3-1

| | Amorphous resin | | Crystalline resin | | | Yellow pigment master batch | | Wax | |
|---|---|---|---|---|---|---|---|---|---|
| Toner No. | Amorphous resin No. | Blending amount [part(s) by mass] | Crystalline resin No. | Acid value [mgKOH/g] | Blending amount [part(s) by mass] | Yellow pigment master batch No. | Blending amount [part(s) by mass] | Wax No. | Blending amount [part(s) by mass] |
| YT1 | Amorphous polyester resin 1 | 67.0 | Crystalline resin 1 | 10.0 | 5.0 | YM1 | 20.0 | Wax 1 | 8.0 |
| YT2 | Amorphous polyester resin 1 | 67.0 | Crystalline resin 2 | 9.5 | 5.0 | YM1 | 20.0 | Wax 1 | 8.0 |
| YT3 | Amorphous polyester resin 1 | 67.0 | Crystalline resin 3 | 10.2 | 5.0 | YM1 | 20.0 | Wax 1 | 8.0 |
| YT4 | Amorphous polyester resin 1 | 67.0 | Crystalline resin 1 | 10.0 | 5.0 | YM2 | 20.0 | Wax 1 | 8.0 |

TABLE 3-1-continued

| | Amorphous resin | | Crystalline resin | | | Yellow pigment master batch | | Wax | |
|---|---|---|---|---|---|---|---|---|---|
| Toner No. | Amorphous resin No. | Blending amount [part(s) by mass] | Crystalline resin No. | Acid value [mgKOH/g] | Blending amount [part(s) by mass] | Yellow pigment master batch No. | Blending amount [part(s) by mass] | Wax No. | Blending amount [part(s) by mass] |
| YT5 | Amorphous polyester resin 1 | 67.0 | Crystalline resin 1 | 10.0 | 5.0 | YM3 | 20.0 | Wax 1 | 8.0 |
| YT6 | Amorphous polyester resin 1 | 67.0 | Crystalline resin 1 | 10.0 | 5.0 | YM4 | 20.0 | Wax 1 | 8.0 |
| YT7 | Amorphous polyester resin 1 | 67.0 | Crystalline resin 1 | 10.0 | 5.0 | YM5 | 20.0 | Wax 1 | 8.0 |
| YT8 | Amorphous polyester resin 1 | 67.0 | Crystalline resin 1 | 10.0 | 5.0 | YM6 | 20.0 | Wax 1 | 8.0 |
| YT9 | Amorphous polyester resin 1 | 67.0 | Crystalline resin 4 | 28.8 | 5.0 | YM1 | 20.0 | Wax 1 | 8.0 |
| YT10 | Amorphous polyester resin 1 | 67.0 | Crystalline resin 5 | 7.1 | 5.0 | YM1 | 20.0 | Wax 1 | 8.0 |
| YT11 | Amorphous polyester resin 1 | 66.0 | Crystalline resin 6 | 47.3 | 6.0 | YM1 | 20.0 | Wax 1 | 8.0 |
| YT12 | Amorphous polyester resin 1 | 67.0 | Crystalline resin 7 | 5.3 | 5.0 | YM1 | 20.0 | Wax 1 | 8.0 |
| YT13 | Amorphous polyester resin 1 | 77.0 | Crystalline resin 1 | 10.0 | 5.0 | YM1 | 10.0 | Wax 1 | 8.0 |
| YT14 | Amorphous polyester resin 1 | 63.0 | Crystalline resin 1 | 10.0 | 4.0 | YM1 | 25.0 | Wax 1 | 8.0 |
| YT15 | Amorphous polyester resin 1 | 78.5 | Crystalline resin 1 | 10.0 | 6.0 | YM1 | 7.5 | Wax 1 | 8.0 |
| YT16 | Amorphous polyester resin 1 | 58.2 | Crystalline resin 1 | 10.0 | 3.8 | YM1 | 30.0 | Wax 1 | 8.0 |
| YT17 | Amorphous polyester resin 1 | 67.0 | Crystalline resin 1 | 10.0 | 5.0 | YM7 | 20.0 | Wax 1 | 8.0 |
| YT18 | Amorphous polyester resin 1 | 67.0 | Crystalline resin 1 | 10.0 | 5.0 | YM8 | 20.0 | Wax 1 | 8.0 |
| YT19 | Amorphous polyester resin 1 | 67.0 | Crystalline resin 1 | 10.0 | 5.0 | YM9 | 20.0 | Wax 1 | 8.0 |
| YT20 | Amorphous polyester resin 1 | 54.5 | Crystalline resin 1 | 10.0 | 5.0 | YM1 | 32.5 | Wax 1 | 8.0 |
| YT21 | Amorphous polyester resin 1 | 69.0 | Crystalline resin 1 | 10.0 | 3.0 | YM1 | 20.0 | Wax 1 | 8.0 |
| YT22 | Amorphous polyester resin 1 | 63.0 | Crystalline resin 1 | 10.0 | 9.0 | YM1 | 20.0 | Wax 1 | 8.0 |
| YT23 | Amorphous polyester resin 1 | 70.0 | Crystalline resin 1 | 10.0 | 2.0 | YM1 | 20.0 | Wax 1 | 8.0 |
| YT24 | Amorphous polyester resin 1 | 51.0 | Crystalline resin 1 | 10.0 | 11.0 | YM1 | 30.0 | Wax 1 | 8.0 |
| YT25 | Amorphous polyester resin 1 | 10.0 | Crystalline resin 8 | 9.7 | 62.0 | YM1 | 20.0 | Wax 1 | 8.0 |
| YT26 | Amorphous polyester resin 1 | 67.0 | Crystalline resin 1 | 10.0 | 5.0 | YM10 | 20.0 | Wax 1 | 8.0 |
| YT27 | Amorphous polyester resin 1 | 67.0 | Crystalline resin 1 | 10.0 | 5.0 | YM11 | 20.0 | Wax 1 | 8.0 |
| YT28 | Amorphous polyester resin 1 | 67.0 | Crystalline resin 1 | 10.0 | 5.0 | YM12 | 20.0 | Wax 1 | 8.0 |

TABLE 3-1-continued

| | Amorphous resin | | Crystalline resin | | | Yellow pigment master batch | | Wax | |
|---|---|---|---|---|---|---|---|---|---|
| Toner No. | Amorphous resin No. | Blending amount [part(s) by mass] | Crystalline resin No. | Acid value [mgKOH/g] | Blending amount [part(s) by mass] | Yellow pigment master batch No. | Blending amount [part(s) by mass] | Wax No. | Blending amount [part(s) by mass] |
| YT29 | Amorphous polyester resin 1 | 82.0 | Crystalline resin 1 | 10.0 | 5.0 | YM1 | 5.0 | Wax 1 | 8.0 |
| YT30 | Amorphous polyester resin 1 | 47.0 | Crystalline resin 1 | 10.0 | 5.0 | YM1 | 40.0 | Wax 1 | 8.0 |
| YT31 | Amorphous polyester resin 1 | 67.0 | Crystalline resin 1 | 10.0 | 5.0 | YM13 | 20.0 | Wax 1 | 8.0 |
| YT32 | Amorphous polyester resin 1 | 67.0 | Crystalline resin 1 | 10.0 | 5.0 | YM14 | 20.0 | Wax 1 | 8.0 |

TABLE 3-2

| Toner No. | P [% by mass] | C [% by mass] | P/C | (P × 6/732)/(C × CA/56.1) | I2/I1 | Weight-average particle diameter of toner (μm) |
|---|---|---|---|---|---|---|
| YT1 | 8.0 | 5.0 | 1.60 | 0.074 | 2.5 | 6.8 |
| YT2 | 8.0 | 5.0 | 1.60 | 0.077 | 2.5 | 6.8 |
| YT3 | 8.0 | 5.0 | 1.60 | 0.072 | 2.5 | 6.8 |
| YT4 | 8.0 | 5.0 | 1.60 | 0.074 | 2.5 | 6.8 |
| YT5 | 8.0 | 5.0 | 1.60 | 0.074 | 2.5 | 6.8 |
| YT6 | 8.0 | 5.0 | 1.60 | 0.074 | 2.5 | 6.8 |
| YT7 | 8.0 | 5.0 | 1.60 | 0.074 | 2.5 | 6.8 |
| YT8 | 8.0 | 5.0 | 1.60 | 0.074 | 2.5 | 6.8 |
| YT9 | 8.0 | 5.0 | 1.60 | 0.026 | 2.5 | 6.8 |
| YT10 | 8.0 | 5.0 | 1.60 | 0.104 | 2.5 | 6.8 |
| YT11 | 8.0 | 6.0 | 1.33 | 0.013 | 2.5 | 6.8 |
| YT12 | 8.0 | 5.0 | 1.60 | 0.139 | 2.5 | 6.8 |
| YT13 | 4.0 | 5.0 | 0.80 | 0.037 | 2.5 | 6.8 |
| YT14 | 10.0 | 4.0 | 2.50 | 0.115 | 2.5 | 6.8 |
| YT15 | 3.0 | 6.0 | 0.50 | 0.023 | 2.5 | 6.8 |
| YT16 | 12.0 | 3.8 | 3.16 | 0.145 | 2.5 | 6.8 |
| YT17 | 8.0 | 5.0 | 1.60 | 0.074 | 2.2 | 6.8 |
| YT18 | 8.0 | 5.0 | 1.60 | 0.074 | 2.1 | 6.8 |
| YT19 | 8.0 | 5.0 | 1.60 | 0.074 | 2.8 | 6.8 |
| YT20 | 13.0 | 5.0 | 2.60 | 0.120 | 2.5 | 6.8 |
| YT21 | 8.0 | 3.0 | 2.67 | 0.123 | 2.5 | 6.8 |
| YT22 | 8.0 | 9.0 | 0.89 | 0.041 | 2.5 | 6.8 |
| YT23 | 8.0 | 2.0 | 4.00 | 0.184 | 2.5 | 6.8 |
| YT24 | 12.0 | 11.0 | 1.09 | 0.050 | 2.5 | 6.8 |
| YT25 | 8.0 | 62.0 | 0.13 | 0.006 | 1.5 | 6.8 |
| YT26 | 8.0 | 5.0 | 1.60 | 0.074 | 1.6 | 6.8 |
| YT27 | 8.0 | 5.0 | 1.60 | 0.074 | 2.6 | 6.8 |
| YT28 | 8.0 | 5.0 | 1.60 | 0.074 | 1.7 | 6.8 |
| YT29 | 2.0 | 5.0 | 0.40 | 0.018 | 2.5 | 6.8 |
| YT30 | 16.0 | 5.0 | 3.20 | 0.147 | 2.5 | 6.8 |
| YT31 | 8.0 | 5.0 | 1.60 | — | No peak | 6.8 |
| YT32 | 8.0 | 5.0 | 1.60 | — | No peak | 6.8 |

Production Example of Magnetic Carrier 1

Magnetite 1 having a number-average particle diameter of 0.30 μm (magnetization intensity under a magnetic field of 1,000/4π (kA/m) of 65 $Am^2/kg$)

Magnetite 2 having a number-average particle diameter of 0.50 μm (magnetization intensity under a magnetic field of 1,000/4π (kA/m) of 65 $Am^2/kg$)

To 100 parts each of the above-mentioned materials, 4.0 parts of a silane compound (3-(2-aminoethylaminopropyl) trimethoxysilane) was added, and the mixture was subjected to high-speed mixing and stirring at 100° C. or more in a vessel to treat fine particles of each material.

Phenol: 10% by mass

Formaldehyde solution: 6% by mass (formaldehyde: 40% by mass, methanol: 10% by mass, water: 50% by mass)

Magnetite 1 treated with the above-mentioned silane compound: 58% by mass

Magnetite 2 treated with the above-mentioned silane compound: 26% by mass

In a flask, 100 parts of the above-mentioned materials, 5 parts of a 28% by mass aqueous ammonia solution, and 20 parts of water were placed. While the contents were stirred and mixed, the temperature was increased to 85° C. in 30 minutes and held to perform a polymerization reaction for 3 hours to cure a produced phenol resin. After that, the cured phenol resin was cooled to 30° C., and water was further added. After that, the supernatant was removed, and the precipitate was washed with water and then air-dried. Then, the air-dried product was dried under reduced pressure (5 mmHg or less) at a temperature of 60° C. to provide a spherical magnetic carrier 1 of a magnetic material dispersion type. The 50% particle diameter (D50) of the magnetic carrier 1 on a volume basis was 34.2 μm.

Production Example of Yellow Two-Component Developer YD1

To 92.0 parts of the magnetic carrier 1, 8.0 parts of the yellow toner YT1 was added, and the contents were mixed with a V-type mixer (V-20 manufactured by Seishin Enterprise Co., Ltd.) to provide a yellow two-component developer YD1.

Production Examples of Yellow Two-component Developers YD2 to YD32

Yellow two-component developers YD2 to YD32 were each obtained by performing production in the same manner as in the yellow two-component developer YD1 except that the materials were changed to those shown in Table 4.

Examples 1 to 25 and Comparative Examples 1 to 7

Methods of evaluating images obtained by using the toners and the two-component developers described above are described below.

<Evaluation of Low-Temperature Fixability>

A reconstructed machine of a printer for digital commercial printing "imagePRESS C810" manufactured by Canon Inc. was used as an image-forming apparatus, and a two-component developer was loaded into its developing unit for a cyan color. As the reconstructed points of the apparatus, changes were made so that its fixation temperature and process speed, the DC voltage VDC of a developer bearing member, the charging voltage VD of an electrostatic latent image-bearing member, and the laser power could be freely set.

In particular, in order to establish that excellent performance can be exhibited in high-speed printing as compared to the related art, evaluation was performed at an increased process speed. In addition, image output evaluation was performed as follows: an FFh image (solid image) having a desired image ratio was output and subjected to evaluations to be described later with the VDC, the VD, and the laser power being adjusted so as to achieve a desired toner laid-on level on the FFh image on paper. FFh is a value obtained by representing 256 gradations in hexadecimal notation; 00 h represents the first gradation (white portion) of the 256 gradations, and FFh represents the 256th gradation (solid portion) of the 256 gradations.

The evaluations were performed based on the following evaluation methods, and the results are shown in Table 4.

Taper: GFC-081 (81.0 g/m$^2$)
(distributed by Canon Marketing Japan Inc.)

Toner laid-on level on paper: 0.90 mg/cm$^2$
(adjusted based on the DC voltage VDC of the developer bearing member, the charging voltage VD of the electrostatic latent image-bearing member, and the laser power)

Evaluation image: An image measuring 2 cm×5 cm was arranged at the center of the above-mentioned A4 paper Test environment: Low-temperature and low-humidity environment: temperature of 15° C./humidity of 10% RH (hereinafter referred to as "L/L")

Fixation temperature: 150° C.

Process speed: 380 mm/sec

The evaluation image was output, and low-temperature fixability was evaluated. The value of an image density reduction ratio was used as an evaluation index for the low-temperature fixability.

For the image density reduction ratio, through use of an X-Rite color reflection densitometer (500 Series: manufactured by X-Rite, Inc.), the image density at the central portion of the image was measured first. Next, the fixed image was rubbed (back and forth 5 times) with lens-cleaning paper with the application of a load of 4.9 kPa (50 g/cm$^2$) to the portion at which the image density had been measured, and the image density was measured again.

Then, an image density reduction ratio between before and after the rubbing was calculated using the following equation. The resultant image density reduction ratio was evaluated in accordance with the following evaluation criteria.

Image density reduction ratio=(image density before rubbing-image density after rubbing)/(image density before rubbing)×100

(Evaluation Criteria)

A: An image density reduction ratio of less than 2.0%

B: An image density reduction ratio of 2.0% or more and less than 5.0%

C: An image density reduction ratio of 5.0% or more and less than 8.0%

D: An image density reduction ratio of 8.0% or more

<Measurement of Change in Image Density>

A full-color copying machine imagePress C810 manufactured by Canon Inc. was used as an image forming apparatus. The above-mentioned two-component developers were each loaded into the developing unit for a yellow color of the image forming apparatus, and the above-mentioned toners were each loaded into the toner container for a yellow color thereof, followed by an evaluation to be described later. Plain paper GF-0081 (A4, basis weight: 81.4 g/m$^2$, distributed by Canon Marketing Japan Inc.) was used as evaluation paper.

The image forming apparatus was adjusted so that a toner laid-on level on the paper in an FFh image (solid image) became 0.45 mg/cm$^2$, and its process speed was adjusted to 380 mm/sec. FFh is a value obtained by representing 256 gradations in hexadecimal notation; 00 h represents the first gradation (white portion) of the 256 gradations, and FFh represents the 256th gradation (solid portion) of the 256 gradations. First, a 1,000-sheet image output test was performed at an image ratio of 1%. During the 1,000-sheet continuous paper passing, the paper was passed under the same developing conditions and transfer conditions (without calibration) as those of the first sheet.

After that, a 1,000-sheet image output test was performed at an image ratio of 80%. During the 1,000-sheet continuous paper passing, the paper was passed under the same developing conditions and transfer conditions (without calibration) as those of the first sheet. The image density on the 1,000th sheet in the printing at an image ratio of 1% was adopted as an initial density, and the image density on the 1,000th sheet in the printing at an image ratio of 80% was measured, followed by the evaluation of a difference between the densities.

The above-mentioned test was performed under each of a normal-temperature and normal-humidity environment (N/N; temperature: 25° C., relative humidity: 55%), and a high-temperature and high-humidity environment (H/H; temperature: 30° C., relative humidity: 80%). The initial density and the image density on the 1,000th sheet in the printing at an image ratio of 80% were measured with an X-Rite color reflection densitometer (500 Series: manufactured by X-Rite, Inc.), and a difference A between the densities was ranked by the following criteria. A result of D or more was judged to be satisfactory.

(Evaluation Criteria Image Density Difference A)

A: Less than 0.020
B: 0.020 or more and less than 0.050
C: 0.050 or more and less than 0.100
D: 0.100 or more and less than 0.150
E: 0.150 or more

TABLE 4

| | | | | Evaluation result | | | |
|---|---|---|---|---|---|---|---|
| | | | | Low-temperature fixability | | Image density stability | |
| | Developer No. | Toner No. | Magnetic carrier No. | Numerical value | Rank | Numerical value | Rank |
| Example 1 | YD1 | YT1 | 1 | 0.8 | A | 0.015 | A |
| Example 2 | YD2 | YT2 | 1 | 1.0 | A | 0.017 | A |
| Example 3 | YD3 | YT3 | 1 | 1.2 | A | 0.017 | A |
| Example 4 | YD4 | YT4 | 1 | 1.2 | A | 0.017 | A |
| Example 5 | YD5 | YT5 | 1 | 1.3 | A | 0.016 | A |
| Example 6 | YD6 | YT6 | 1 | 0.8 | A | 0.026 | B |
| Example 7 | YD7 | YT7 | 1 | 1.5 | A | 0.028 | B |
| Example 8 | YD8 | YT8 | 1 | 0.7 | A | 0.028 | B |
| Example 9 | YD9 | YT9 | 1 | 1.2 | A | 0.029 | B |
| Example 10 | YD10 | YT10 | 1 | 1.1 | A | 0.025 | B |
| Example 11 | YD11 | YT11 | 1 | 1.2 | A | 0.031 | B |
| Example 12 | YD12 | YT12 | 1 | 1.2 | A | 0.029 | B |
| Example 13 | YD13 | YT13 | 1 | 1.5 | A | 0.028 | B |
| Example 14 | YD14 | YT14 | 1 | 2.1 | B | 0.028 | B |
| Example 15 | YD15 | YT15 | 1 | 0.7 | A | 0.028 | B |
| Example 16 | YD16 | YT16 | 1 | 5.4 | C | 0.028 | B |
| Example 17 | YD17 | YT17 | 1 | 0.6 | A | 0.029 | B |
| Example 18 | YD18 | YT18 | 1 | 1.3 | A | 0.031 | B |
| Example 19 | YD19 | YT19 | 1 | 1.3 | A | 0.033 | B |
| Example 20 | YD20 | YT20 | 1 | 2.5 | B | 0.032 | B |
| Example 21 | YD21 | YT21 | 1 | 5.6 | C | 0.035 | B |
| Example 22 | YD22 | YT22 | 1 | 1.0 | A | 0.071 | C |
| Example 23 | YD23 | YT23 | 1 | 7.6 | C | 0.018 | A |
| Example 24 | YD24 | YT24 | 1 | 0.8 | A | 0.139 | D |
| Example 25 | YD25 | YT25 | 1 | 0.5 | A | 0.065 | C |
| Comparative Example 1 | YD26 | YT26 | 1 | 1.2 | A | 0.182 | E |
| Comparative Example 2 | YD27 | YT27 | 1 | 1.2 | A | 0.191 | E |
| Comparative Example 3 | YD28 | YT28 | 1 | 1.3 | A | 0.183 | E |
| Comparative Example 4 | YD29 | YT29 | 1 | 1.2 | A | 0.187 | E |
| Comparative Example 5 | YD30 | YT30 | 1 | 8.2 | D | 0.075 | C |
| Comparative Example 6 | YD31 | YT31 | 1 | 1.2 | A | 0.184 | E |
| Comparative Example 7 | YD32 | YT32 | 1 | 1.3 | A | 0.186 | E |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-100003, filed Jun. 22, 2022, and Japanese Patent Application No. 2023-095999, filed Jun. 12, 2023, which are hereby incorporated by reference herein in their entirety.

What is claimed is:

1. A yellow toner comprising a toner particle containing a binder resin, a crystalline resin, and C.I. Pigment Yellow 180, wherein a content of the C.I. Pigment Yellow 180 is 3% by mass or more and 15% by mass or less with respect to a mass of the toner, wherein the C.I. Pigment Yellow 180 is in a form of plate-like particles each having a plate-like shape, and wherein when the C.I. Pigment Yellow 180 is observed with a scanning electron microscope, the plate-like particles of the C.I. Pigment Yellow 180 satisfy following relationships:

$$S/Z \geq 10.0; \text{ and}$$

$$50 \leq S \leq 300,$$

where the S (nm) represents a number average of circle-equivalent diameters calculated from areas of surfaces having largest areas of the plate-like particles of the C.I. Pigment Yellow 180, and the Z (nm) represents a number average of widths in directions perpendicular to the surfaces having the largest areas of the plate-like particles of the C.I. Pigment Yellow 180.

2. The yellow toner according to claim 1, wherein the toner has a peak at each of $2\theta=6.5°\pm0.1°$ and $2\theta=13.5°\pm0.1°$, where the $\theta$ represents a Bragg angle in X-ray diffraction measurement of the toner with a CuK$\alpha$ ray, and wherein the toner satisfies a following relationship:

$$I2/I1 \geq 2.0,$$

where the I1 represents a peak intensity at $2\theta=6.5°\pm0.1°$, and the I2 represents a peak intensity at $2\theta=13.5°\pm0.1°$.

3. The yellow toner according to claim 1, wherein a content of the crystalline resin is 2% by mass or more and 10% by mass or less with respect to the mass of the toner particle.

4. The yellow toner according to claim 1, wherein the toner satisfies a following relationship:

$$0.5 \leq P/C \leq 3.0,$$

where the C (% by mass) represents a content of the crystalline resin in the toner, and the P (% by mass) represents the content of the C.I. Pigment Yellow 180 in the toner.

5. The yellow toner according to claim 1, wherein the toner satisfies a following relationship:

$$0.015 \leq (P \times 6/732)/(C \times CA/56.1) \leq 0.113,$$

where the CA [mgKOH/g] represents an acid value of the crystalline resin, the C (% by mass) represents a content of the crystalline resin in the toner, and the P (% by mass) represents the content of the C.I. Pigment Yellow 180 in the toner.

6. The yellow toner according to claim 1, wherein the toner comprises a nonionic surfactant, and wherein a content of the nonionic surfactant is 1 part by mass or more and 5 parts by mass or less with respect to 100 parts by mass of the C.I. Pigment Yellow 180.

7. The yellow toner according to claim 6, wherein the nonionic surfactant is a polyoxyethylene alkyl ether.

8. The yellow toner according to claim 1, wherein the crystalline resin is crystalline polyester, and wherein the crystalline polyester has a structure derived from a linear aliphatic polyhydric alcohol having 2 to 12 carbon atoms, and a structure derived from a linear aliphatic polyvalent carboxylic acid having 2 to 14 carbon atoms.

9. The yellow toner according to claim 8, wherein the crystalline polyester has a unit derived from an $\alpha,\omega$-linear aliphatic diol and a unit derived from an $\alpha,\omega$-linear aliphatic dicarboxylic acid, the linear aliphatic diol has 2 to 6 carbon atoms, and the linear aliphatic dicarboxylic acid has 10 to 14 carbon atoms.

10. The yellow toner according to claim 1, wherein the crystalline resin has a monomer unit represented by a following formula (1):

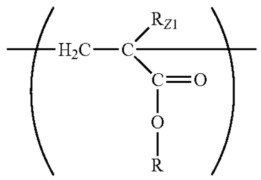

(1)

in the formula (1), $R_{Z1}$ represents a hydrogen atom or a methyl group, and R represents an alkyl group having 18 to 36 carbon atoms.

* * * * *